(12) United States Patent
Adogla et al.

(10) Patent No.: US 12,034,595 B2
(45) Date of Patent: Jul. 9, 2024

(54) DYNAMICALLY REPROGRAMMABLE REGION LATTICES

(71) Applicant: ORACLE INTERNATIONAL CORPORATION, Redwood Shores, CA (US)

(72) Inventors: Eden Adogla, Seattle, WA (US); Navaneeth Garakahalli, Mill Creek, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/984,569

(22) Filed: Nov. 10, 2022

(65) Prior Publication Data
US 2024/0163167 A1    May 16, 2024

(51) Int. Cl.
*G06F 15/177*  (2006.01)
*H04L 41/082*  (2022.01)
*H04L 41/0866*  (2022.01)
*H04L 41/12*  (2022.01)

(52) U.S. Cl.
CPC ........ *H04L 41/082* (2013.01); *H04L 41/0866* (2013.01); *H04L 41/12* (2013.01)

(58) Field of Classification Search
CPC .... H04L 41/082; H04L 41/0866; H04L 41/12
See application file for complete search history.

(56) References Cited

U.S. PATENT DOCUMENTS

| | | | |
|---|---|---|---|
| 2015/0026667 A1* | 1/2015 | Pruss | G06F 11/3668 717/135 |
| 2021/0149706 A1* | 5/2021 | Liu | G06F 9/45558 |

* cited by examiner

*Primary Examiner* — Padma Mundur
(74) *Attorney, Agent, or Firm* — Kilpatrick Townsend & Stockton LLP

(57) ABSTRACT

Techniques are disclosed for implementing a dynamically reconfigurable network lattice within a distributed computing system. A computing device may determine a combined configuration that includes a union of at least a subset of cloud infrastructure component topologies. The computing device may then provide instructions for implementing a physical layer characterized by the combined configuration. The computing device may then determine a subset configuration corresponding to a cloud infrastructure component topology of the subset of cloud infrastructure component topologies. The computing device may then deploy the subset configuration to the physical layer of the distributed computing system.

19 Claims, 12 Drawing Sheets

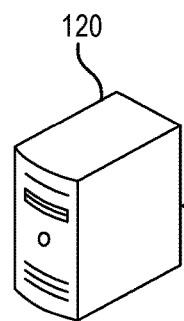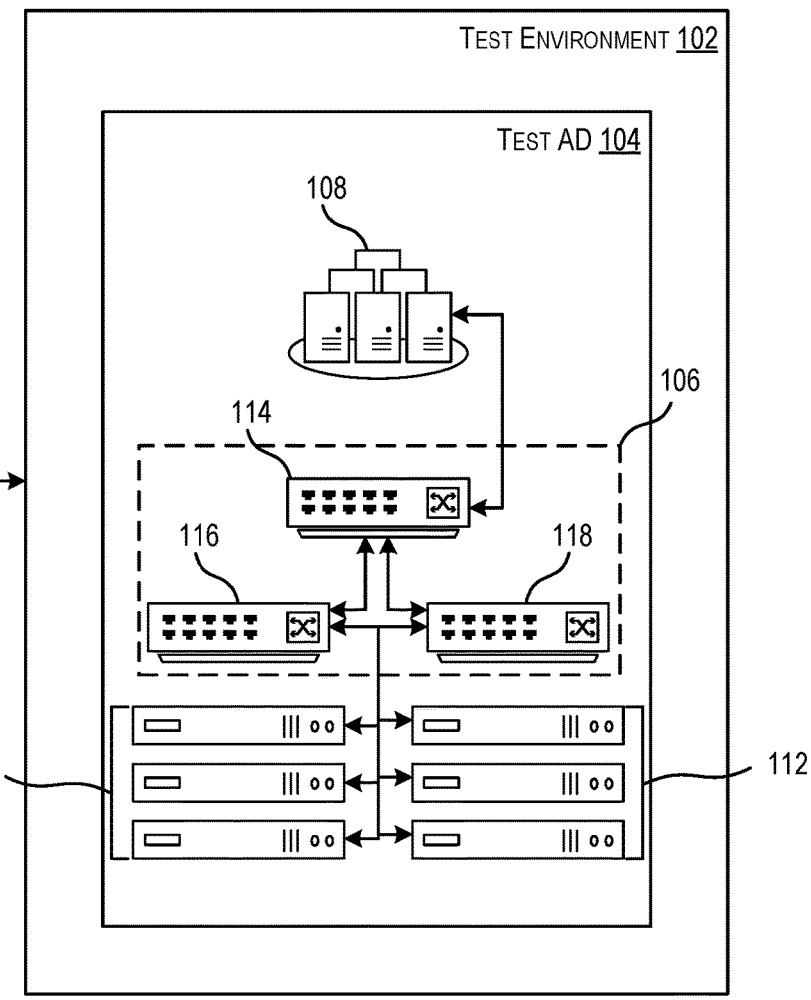
FIG. 1

DYNAMICALLY REPROGRAMMABLE REGION LATTICES

BACKGROUND

Cloud service providers may implement various configurations of infrastructure components in data centers throughout the world. The configurations can include arrangements of physical computing devices and networking devices designed to create a computing environment suitable for the needs of the cloud service provider's customers. Because of the complexity and multiplicity of different configurations, testing the connectivity and performance of the different configurations can be difficult.

BRIEF SUMMARY

Embodiments of the present disclosure relate to implementing a dynamically reconfigurable network within a distributed computing system. The distributed computing system can include cloud computing infrastructure of a cloud service provider, including computing resources networked in one or more data centers. The distributed computing system can include a testing environment that can correspond to different production computing environments. To change between different testing environments, the computing resources (e.g., servers, storage, networking devices, etc.) within the distributed computing system can be physically networked together in a manner that can encompass each desired networking arrangement. By reconfiguring the existing networking infrastructure components, the distributed computing system can be changed from one environment to another environment automatically and with reduced manual interactions to add and/or remove components.

One embodiment is directed to a method that can include determining a combined configuration for a distributed computing system. The combined configuration can include a union of at least a subset of cloud infrastructure component topologies of the distributed computing system. For example, a cloud infrastructure component topology can correspond to a specific network or portion of the network within the distributed computing system. The method can also include providing instructions for implementing a physical layer of the distributed computing system. The physical layer can include one or more networking devices communicatively connected to one or more computing devices in the distributed computing system. The physical layer may be characterized by the combined configuration. The method can also include determining a subset configuration of the distributed computing system to test. The subset configuration can correspond to a cloud infrastructure component topology of the subset of cloud infrastructure component topologies. The method can also include deploying the subset configuration to the physical layer. Deploying the subset configuration to the physical layer can include configuring one or more networking components in the distributed computing system to conform the cloud infrastructure component topology of the distributed computing system to the subset configuration.

Another embodiment is directed to a computing device comprising one or more processors and instructions that, when executed by the one or more processors, cause the computing device to perform the method(s) disclosed herein.

Still another embodiment is directed to a computer-readable medium storing computer-executable instructions that, when executed by one or more processors of a computing device, cause the computing device to perform the method(s) disclosed herein.

BRIEF DESCRIPTION OF DRAWINGS

FIG. 1 is a block diagram depicting an example distributed computing system with a test environment configurable to represent an availability domain, according to at least one embodiment.

DETAILED DESCRIPTION

Figure 2:
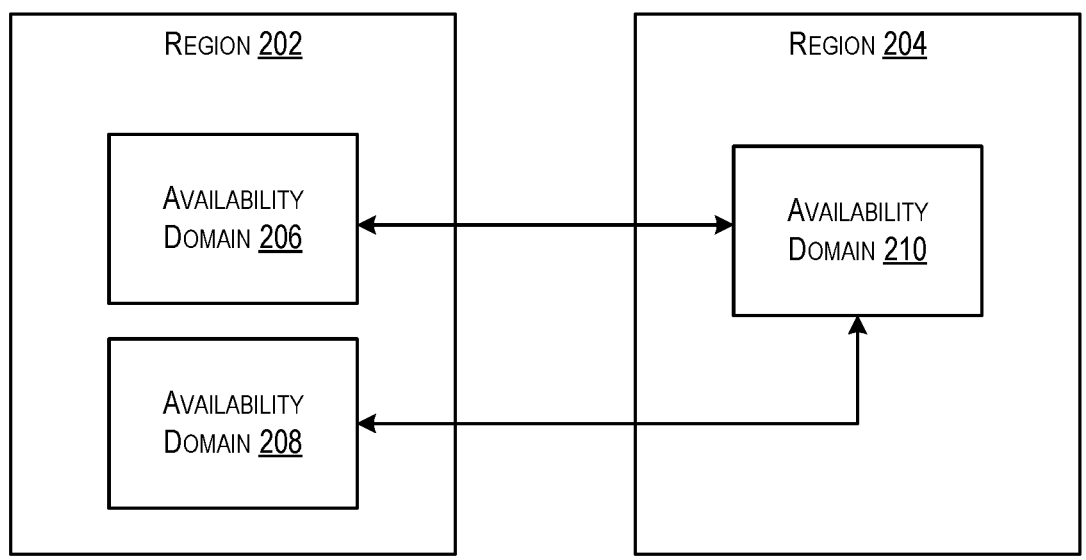
FIG. 2 is a block diagram illustrating an example arrangement of availability domains across multiple regions, according to some embodiments.

The present disclosure describes techniques for dynamically reconfiguring a network topology for cloud service infrastructure components in a distributed computing system. The techniques can include methods, systems, and computer-readable media that enable a cloud service provider (CSP) to implement a computing environment that can be configured for multiple network topologies and reconfigured automatically in response to a desired change to the network topology without the need to change physical infrastructure components, devices, and/or connections. For example, a distributed computing system may be configured as a testing environment to simulate one or more production environments. The network topology of the distributed computing system (e.g., the cloud infrastructure component topology) can reflect a particular production environment (e.g., an environment for a particular customer). The distributed computing system can have physical networking components that can support the particular production environment and other potential network topologies. Switching between specific configurations may be done by reconfiguring the networking topology without changing the physical networking infrastructure.

The infrastructure provided within a CSP's computing environments can be varied. A CSP may be responsible for providing the infrastructure and resources that are used for providing cloud services to subscribing customers. The resources provided by the CSP can include both hardware and software resources. These resources can include, for example, compute resources (e.g., virtual machines, containers, applications, processors), memory resources (e.g., databases, data stores), networking resources (e.g., routers, host machines, load balancers), identity, and other resources. In certain implementations, the resources provided by a CSP for providing a set of cloud services are organized into data centers. A data center may be configured to provide a particular set of cloud services. The CSP is responsible for equipping the data center with infrastructure and resources that are used to provide that particular set of cloud services. As mentioned above, in some cases, a CSP may provide sufficient physical networking resources within a data center to support multiple networking configurations within the data center. A CSP may build one or more data centers.

Data centers provided by a CSP may be hosted in different regions. A region is a localized geographic area and may be identified by a region name. Regions are generally independent of each other and can be separated by vast distances, such as across countries or even continents. Regions are grouped into realms. Examples of regions for a CSP may include US West, US East, Australia East, Australia Southeast, and the like.

A region can include one or more data centers, where the data centers are located within a certain geographic area corresponding to the region. As an example, the data centers in a region may be located in a city within that region. For example, for a particular CSP, data centers in the US West region may be located in San Jose, California; data centers in the US East region may be located in Ashburn, Virginia; data centers in the Australia East region may be located in Sydney, Australia; data centers in the Australia Southeast region may be located in Melbourne, Australia; and the like.

Data centers within a region may be organized into one or more availability domains (AD), which are used for high availability and disaster recovery purposes. An availability domain can include one or more data centers within a region. Availability domains within a region are isolated from each other, fault tolerant, and are architected in such a way that data centers in multiple availability domains are very unlikely to fail simultaneously. For example, the availability domains within a region may be structured in a manner such that a failure at one availability domain within the region is unlikely to impact the availability of data centers in other availability domains within the same region.

The cloud infrastructure component topology supporting one set of availability domains may be different from the cloud infrastructure component topology supporting another set of availability domains. For example, a Region may be configured to have one, two, three, or any suitable number of availability domains. A dynamically reconfigurable region may have physical networking infrastructure to support each of the one AD, two AD, or three AD configurations within the region. Changing a computing environment representing a Region with one AD to a Region with three ADs can include reconfiguring the cloud infrastructure component topology without modifying the physical networking components or architecture.

The techniques described herein can extend beyond a testing environment. Portions of a distributed computing system can be configured to support a dynamic networking architecture and dynamic reconfiguration. A production region for a customer with frequently changing configurations at the AD and/or Region level may benefit from a dynamically configurable network lattice. For example, a customer of a CSP may have users accessing cloud services and/or other cloud resources from different geographic regions that frequently change. The CSP can implement a dynamically reconfigurable region network lattice within one or more data centers within the region to allow for fast and efficient modifications of the availability domains therein.

The techniques described herein may provide numerous advantages over conventional networking architecture within data centers. For example, computing environments used by the CSP for testing may have a reduced footprint. Instead of building and tearing down individual testing environments for each specific networking topology (e.g., one AD, three ADs, etc.), the CSP can implement a comprehensive physical network that can support all the desired networking topologies within the Region. This comprehensive physical network may form a superset configuration of the network topologies, with reconfigurations of the physical network allowing for selections of different subset configurations without removing, adding, or modifying physical networking infrastructure (e.g., networking devices, cabling, etc.). In addition, the dynamically reconfigurable networking infrastructure can result in improved and more accurate testing. Multiple configurations and infrastructure deployments can be tested rapidly, allowing for direct and immediate comparisons. Further, the disclosed techniques may result in a reduced likelihood of errors in setting up a different networking topology. Since the physical network has been implemented once initially, reconfiguring from one topology to another can occur without making or modifying networking connections, reducing errors in connecting devices within the data centers.

FIG. 1 is a block diagram depicting an example distributed computing system 100 with a test environment 102 configurable to represent an availability domain, according to at least one embodiment. The availability domain may be a test availability domain 104. The test environment 102 can include more availability domains than the test availability domain 104. As described herein, the test environment 102 may be representative of a region of a CSP, including computing resources of one or more data centers in the region.

The test environment 102 can include computing resources that are configurable to provide any suitable computing service within the test environment 102, including one or more cloud services. For example, the computing resources can include compute, storage, networking, and similar resources. The computing resources may be provided by any suitable computing devices, including server devices, storage devices, networking devices. For example, the test availability domain 104 can include server devices 110 and server devices 112, and additional computing devices 108. The server devices 110, 112 may be networked together in a cloud infrastructure component topology 106. The cloud infrastructure component topology 106 can include networking devices and network cabling to implement the network between the server devices 110, 112 and the additional computing devices 108. Networking devices can include physical devices like switches, routers, gateways and virtual devices (e.g., virtual switches, virtual gateways, etc.) usable to form a computing network. As depicted in FIG. 1, the cloud infrastructure component topology 106 can include networking devices 114-118.

The cloud infrastructure component topology 106 can include connections between servers, point of presence (POP) networking devices, cross domain solutions (CDS), and other devices in the test environment 102, including other computing devices in additional ADs of the test environment 102. A point of presence may include one or more networking devices that are configurable to connect the computing devices and other resources in the test environment 102 to an external or other distinct network (e.g., the public Internet). For example, a point of presence can include one or more routers, switches, gateways, and/or server devices located at the edge of the CSP network (e.g., at the edge of cloud infrastructure component topology 106) to connect the network of a CSP data center to the Internet. A CDS refers to a combination of software and hardware configured to enforce restrictions on traffic between two security domains according to one or more security policies. A CDS can include both hardware (e.g., computers, routers, switches, gateways, etc.) and software (e.g., filters, virtual data diodes, virtual networking devices, etc.) configured to permit secure, one-way paths of data (e.g., traffic, requests, software resources, etc.). A CDS may be configured to allow ingress and egress of traffic to and from an AD. As described in more detail below with respect to FIG. 4, physical networking resources within a computing environment that can support all of the desired network topologies may include the implementation of a CDS for each AD. Depending on the configuration chosen for the networking lattice, a particular CDS for an AD may be configured to be operable according to one topology (e.g., with traffic into and out of the AD transiting the CDS) but not according to another (e.g., traffic into and out of the AD transiting a different physical networking route).

Computing device 120 can be a suitable device or more than one device configured to run tests on network connectivity. For example, computing device 120 may be a server configured to automatically execute one or more tests of the network connections (e.g., routes, ports, etc.) between devices within the test environment 102. In some embodiments, computing device 120 may test the network connectivity of cloud infrastructure component topology 106 after a reconfiguration of the test environment 102 from a different cloud infrastructure component topology to cloud infrastructure component topology 106. The tests can include determining that each computing device or networking device within the test environment 102 are correctly connected according to the desired topology. For example, the tests can verify that server devices 110 are correctly connected to networking devices 116, 118 and that networking traffic can reach all necessary endpoints within the network. In some embodiments, the computing device 120 can automatically determine a superset configuration for a network as a union of several different networking topologies. For example, CSP networking architects may design discrete network topologies for testing. The computing device 120 may automatically determine a combined configuration that includes the minimum number of physical connections and networking devices to implement all of the subset topologies.

FIG. 2 is a block diagram illustrating an example arrangement 200 of availability domains across multiple regions, according to some embodiments. As discussed above, a region can include one or more data centers located within a certain geographic area corresponding to the region. For example, region 202 may include one or more data centers for a region of the west coast of the United States (e.g., San Jose region), while region 204 may include one or more data centers for a region of the east coast of the United States (e.g., Dulles region).

The data centers within a region may be organized into one or more ADs. For example, region 202 may include availability domain 206 and availability domain 208, while region 204 can include availability domain 210. availability domain 206 may include one or more data centers, while availability domain 208 may include the same number or a different number of data centers as availability domain 206. Similarly, availability domain 210 may include one or more data centers within region 204. As depicted, region 202 and region 204 can include different numbers of ADs. Accordingly, when developing and testing regions for deployment, a testing environment that can represent the two AD networking topology of region 202 and the one AD networking topology of region 204 may be beneficial.

In some embodiments, availability domains 206, 208 in region 202 may not be connected to availability domain 210 in region 204. In other embodiments, availability domains 206, 208 in region 202 may be connected to availability domain 210 in region 204. Inter-region connections can be implemented with a CDS.

Figure 3:
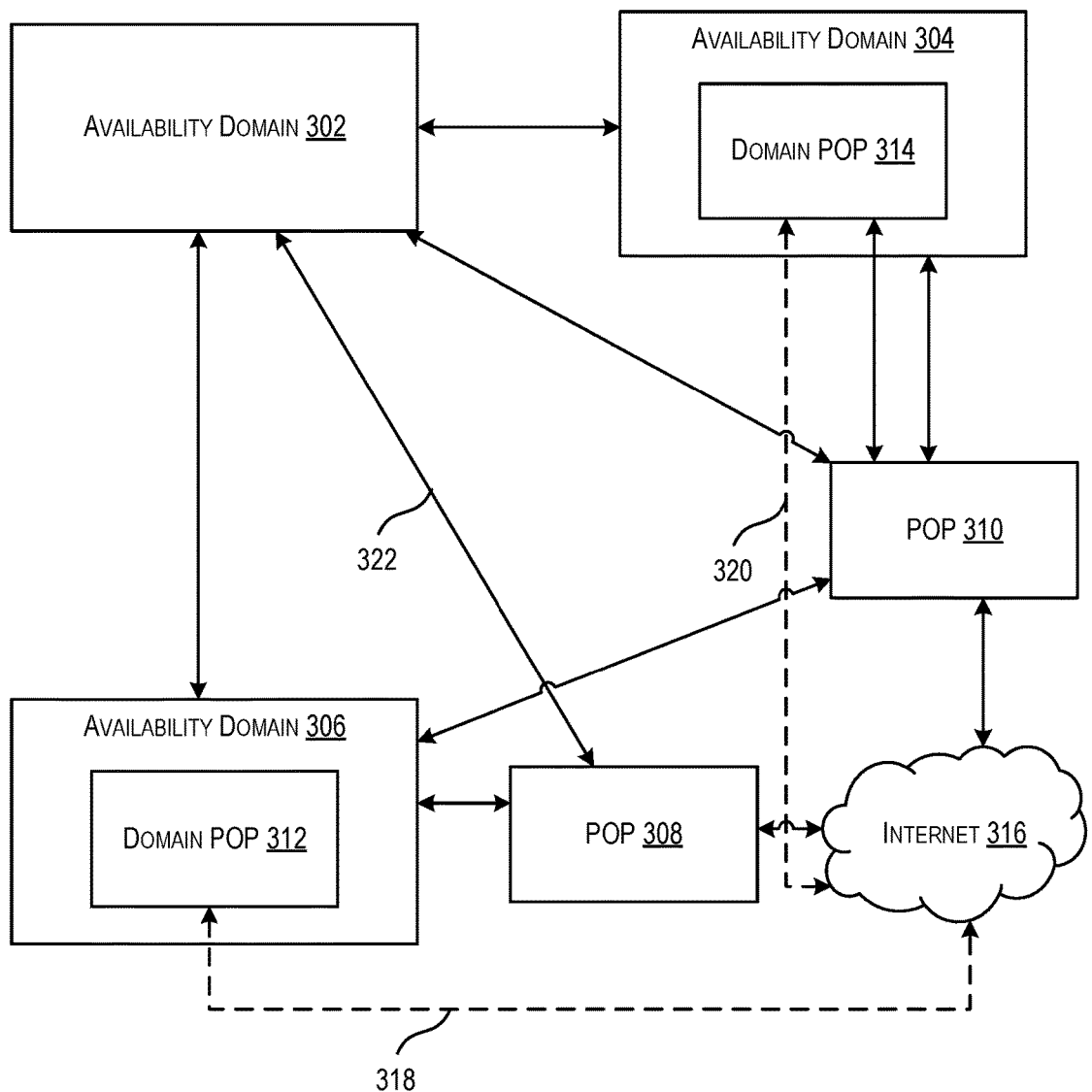
FIG. 3 is a block diagram depicting a subset configuration of a distributed computing system, according to some embodiments.

FIG. 3 is a block diagram depicting a subset configuration 300 of a distributed computing system, according to some embodiments. The subset configuration 300 may be one configuration of a computing environment, for example test environment 102 of FIG. 1. The subset configuration can include a particular arrangement of networking connections for the devices and computing resources within the distributed computing system. For example, the subset configuration 300 can include connections between the devices in three ADs, which may connect to the Internet 316 via two POPs. The precise networking topology of subset configuration 300 is represented by the solid arrows in FIG. 3.

In the subset configuration 300 shown in FIG. 3, the distributed computing system can include availability domain 302, availability domain 304, and availability domain 306. Each of these ADs may be an example of test availability domain 104 of FIG. 1. The availability domains 302-306 can each include one or more data centers of the distributed computing system, with each data center having multiple computing resources and other devices connected as a network to implement the AD. The subset configuration 300 also includes four POPs. In some embodiments, the POPs can include POP 308 and POP 310. POP 308 and POP 310 may be located outside of any of the availability domains 302-306. In other words, POP 308 and POP 310 can include networking devices that are outside the boundaries of an AD and may be physically located separate from the data centers of the AD. For example, POP 308 may be configured to provide access to the Internet 316 via an internet service provider and may therefore be located in an adjoining facility to one of the data centers within availability domains 302-306. Because the POPs 308, 310 are not collocated with the availability domains, the POPs 308, 310 may have independent protections against faults and failures from the fault-tolerant features of each of the availability domains 302-306. For example, if availability domain 306 fails, availability domain 302 may still access an external network like Internet 316 via either POP 308 or POP 310.

In some embodiments, a POP may be collocated with one of the data centers within an AD. These domain POPs may then include suitable edge networking devices to provide external network access to computing resources within an AD from a location at an AD data center. For example, domain POP 312 may be located in a data center of availability domain 306, while domain POP 314 may be located in a data center of availability domain 304. In some embodiments, the domain POP may provide networking connectivity to another POP. For example, domain POP 314 may provide connectivity to POP 310. This connectivity may represent an alternate network path between a portion of the computing resources within availability domain 304 to POP 310. For example, domain POP 314 may provide connectivity to POP 310 for one data center in availability domain 304, while another data center in availability domain 304 connects directly to POP 310 without a separate collection of edge devices that form another domain POP.

The networking connections represented by the solid arrows in FIG. 3 may be implemented by any suitable physical media for connecting computing devices in a distributed computing system, including Ethernet, fiber optic cabling, coaxial cabling, wireless and/or cellular connections, and the like. The subset configuration 300 may include the minimum number of physical connections to implement the desired networking topology. For example, the connection 322 between availability domain 302 and POP 308 may be implemented as a single fiber optic trunk line, which can be sufficient to support the traffic between availability domain 302 and POP 308. If the connection 322 required additional cabling (e.g., multiple fiber connections), the additional cabling can represent a distinct networking topology that is not included in subset configuration 300, but rather in a distinct subset configuration.

Similarly, subset configuration 300 may not include additional network connections 318, 320. Configurations where additional network connection 318 connects domain POP 312 to the Internet 316 and/or additional network connection 320 connects domain POP 314 to the Internet 316 would be different from subset configuration 300. These configurations can be considered distinct subset configurations of the cloud infrastructure component topology for a distributed computing system.

Figure 4:
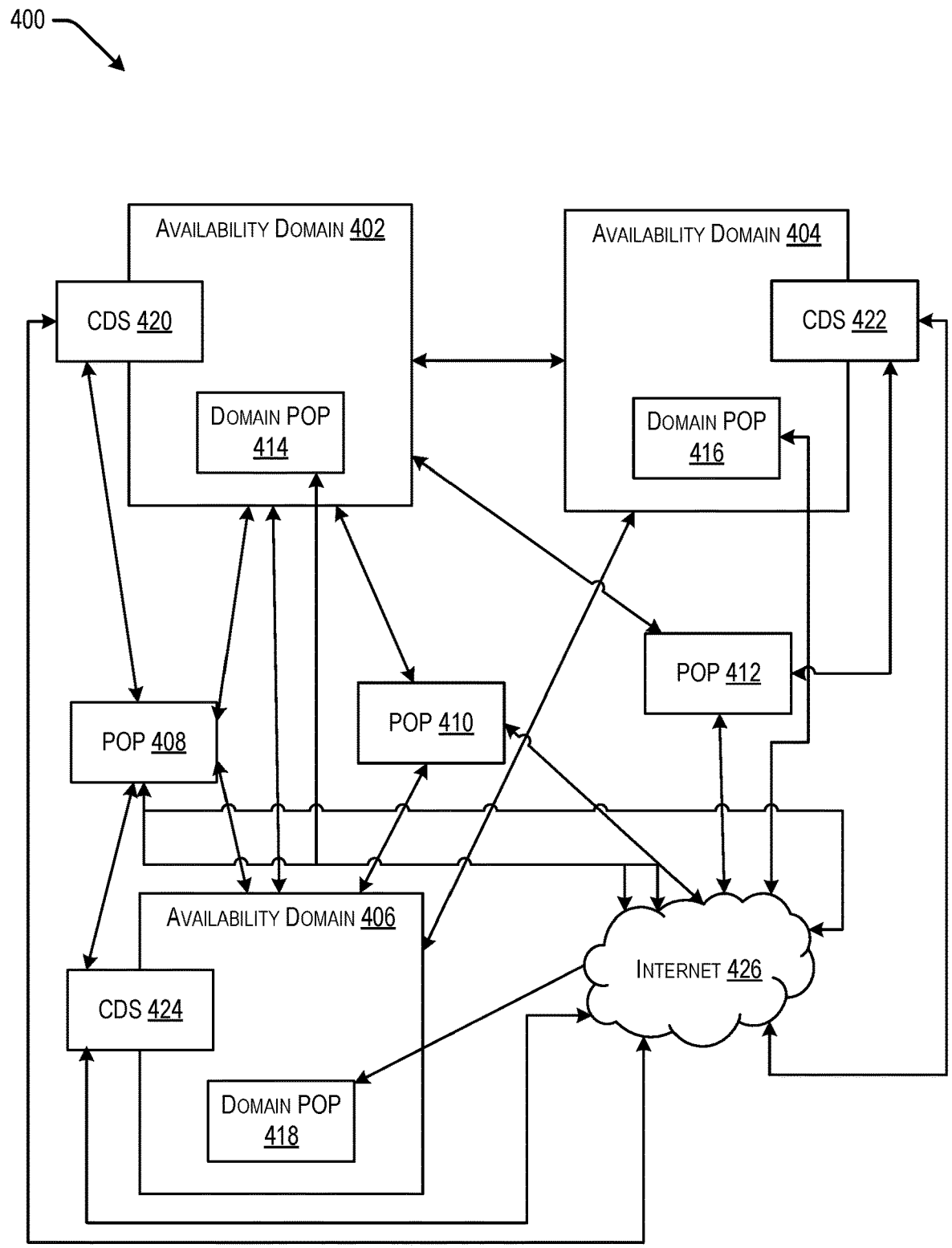
FIG. 4 is a block diagram depicting a combined configuration of a distributed computing system, according to some embodiments.

FIG. 4 is a block diagram depicting a combined configuration 400 of a distributed computing system, according to some embodiments. The combined configuration 400 can include the physical network to support all possible network topologies defined by a CSP between the data centers of one or more ADs and one or more POPs providing access to an external network (e.g., the Internet 426). The distributed computing system may be similar to the distributed computing system described above with respect to FIG. 3, with three availability domains 402-406. The distributed computing system can also include three POPs 408-412 located outside the availability domains 402-406 as well as three domain POPs 414-418 collocated with a corresponding AD. Each of availability domains 402-406 can also include a CDS that can be configured to handle networking traffic into and out of a corresponding AD.

The combined configuration 400 can include a networking connection between each AD and each POP. Different arrangements of networking connections in the combined configuration 400 can each be a subset configuration corresponding to a particular cloud infrastructure component topology. For example, availability domain 402 may be connected directly to availability domain 404 and availability domain 406 and connected to each of POPs 408-412. availability domain 402 may also be connected to availability domain 404 and availability domain 406 via CDS 420 and corresponding CDSs 422, 424. In another subset configuration, availability domain 402 may connect to the Internet 426 via domain 414 rather than any of POP 408-412. Thus, combined configuration 400 can represent all possible distinct network topologies that have been physically implemented within the distributed computing system.

Subset configurations of combined configuration 400 can include fewer than the three availability domains 402-406. For example, a first subset configuration for a first cloud infrastructure component topology for the distributed computing system can include only availability domain 404, CDS 422, and POP 412. A second subset configuration for a second cloud infrastructure component topology for the distributed computing system can include all three availability domains 402-406, POPs 408-412, but no domain POPs and no CDSs. Switching between the first cloud infrastructure component topology and the second cloud infrastructure component topology can include implementing configuration changes to networking devices to disable the physical networking connections that are not used in a topology and/or enabling the physical networking connections that are used in the topology. For example, switches and gateways having connections between availability domain 404 and availability domain 402 may be configured to disable ports supporting the connection between availability domain 402 and availability domain 404 when switching between a first networking topology that includes both availability domain 402 and availability domain 404 and a second networking topology that includes availability domain 404 but does not include availability domain 402.

The combined configuration 400 may be determined automatically by a computing device (e.g., computing device 120 of FIG. 1) based on a collection of subset configurations. For example, network architects of a CSP can provide one or more network topologies that are each a subset configuration. The computing device can generate the combined configuration 400 by identifying the union of the subset configurations. The computing device can also determine the minimum number and/or size of physical networking connections between components that are sufficient to implement the combined configuration 400. For example, for a first subset configuration that includes availability domain 402 and availability domain 404 (and a corresponding networking connection between them) and a second subset configuration that includes availability domain 402, availability domain 404, and availability domain 406 (and corresponding networking connections between all three), the computing device can determine that the union of the first subset configuration and the second subset configuration only requires one networking connection between availability domain 402 and availability domain 404.

Once the combined configuration 400 has been determined, the computing device can provide instructions to implement the physical layer. The instructions may be used by CSP personnel when building a distributed computing system (e.g., a testing environment). In some embodiments, the instructions may be executed automatically by the distributed computing system to configure existing physical connections to form the physical layer. For example, the distributed computing system could execute the instructions to enable and/or disable switch ports, deploy additional virtual networking devices (e.g., virtual gateways) to establish networking connections between devices, and the like.

After implementing the physical networking layer for the combined configuration 400, a computing device (e.g., computing device 120 of FIG. 1) can execute one or more tests to verify the correct configuration of the physical layer. For example, the computing device can test all of the networking connections defined by the combined configuration 400. The tests can include verifying one or more subset configurations. In addition, the computing device can run networking tests to verify the cloud infrastructure component topology after switching between a first subset configuration and a second subset configuration. The tests can include evaluating performance metrics associated with the components of the computing environment. The performance metrics can include network latency, packet loss, retry rate, connection drop occurrence rate, and other similar networking metrics.

Figure 5:
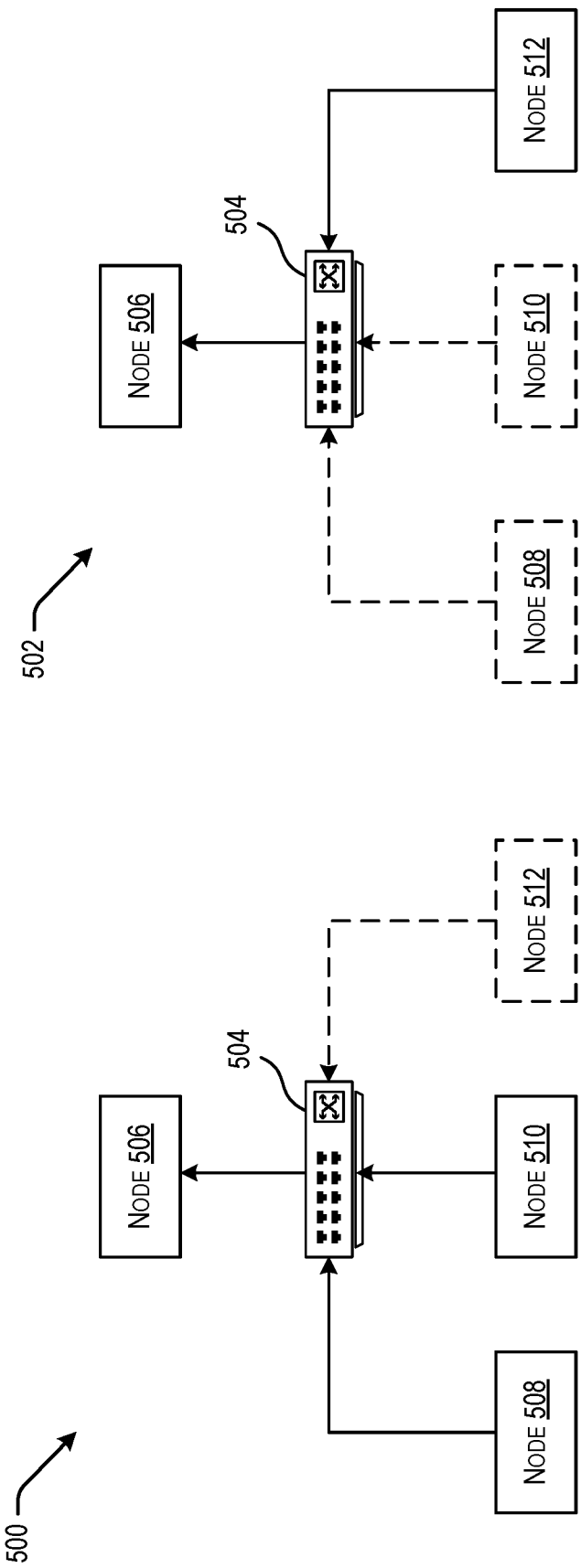
FIG. 5A is a block diagram illustrating a first subset configuration implemented at a physical layer of a distributed computing system, according to some embodiments.
FIG. 5B is a block diagram illustrating a second subset configuration implemented at a physical layer of a distributed computing system, according to some embodiments.

FIG. 5A is a block diagram illustrating a first subset configuration 500 implemented at a physical layer of a distributed computing system, according to some embodiments. As used herein, the term physical layer can include networking devices communicatively connected one or more computing devices of a distributed computing system. The physical layer can include a networking device 504 (e.g., a switch). The first subset configuration 500 may be a subset configuration of a combined configuration of a physical layer of the distributed computing system (e.g., combined configuration 400 of FIG. 4).

FIG. 5B is a block diagram illustrating a second subset configuration 502 implemented at a physical layer of the distributed computing system, according to some embodiments. The physical layer can include the networking device 504.

The first subset configuration 500 can specify a first cloud infrastructure component topology to network computing resources within the distributed computing system. The computing resources may be represented as nodes including node 506, node 508, and node 510. The first cloud infrastructure component topology may not include node 512. Similarly, the second subset configuration 502 can specify a second cloud infrastructure component topology to network computing resources within the distributed computing system. The second cloud infrastructure component topology can include node 506 and node 512, but not include node 508 and node 510. As discussed above, a combined configuration for the physical layer of the distributed computing system can include the union the first subset configuration and the second subset configuration. Because the first subset configuration 500 networks more nodes than the second subset configuration 502, the combined configuration may specify that the network device 504 have a minimum size (e.g., minimum number of ports) to support both the first cloud infrastructure component topology and the second cloud infrastructure component topology.

In some examples, both the first subset configuration 500 and the second subset configuration 502 can be deployed to the physical layer of the distributed computing system first cloud infrastructure component topology and the second cloud infrastructure component topology simultaneously. Network device 504 may be configured with the first subset configuration 500 to support network connections between node 506, node 508, and node 510 and may be configured with the second subset configuration 502 to support network connections between node 506 and node 512. The network device 504 may be configured to isolate the network traffic for the first subset configuration 500 from the second subset configuration 502.

In some examples, deploying the second subset configuration 502 can include replacing the first subset configuration 500. In these examples, the network device 504 may be configured to support only the second subset configuration 502 after deployment. For example, ports of a network switch may be activated and/or deactivated according to the second subset configuration 502 to support network connections between node 506 and node 512 while removing network connections between node 506, node 508, and node 510.

Figure 6:
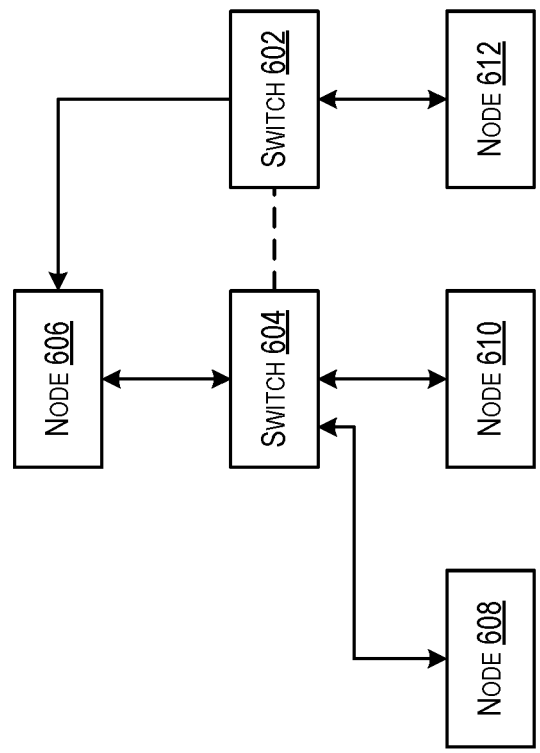
FIG. 6 is a block diagram depicting an updated configuration with an additional component of a physical layer of a distributed computing system, according to some embodiments.

FIG. 6 is a block diagram depicting an updated configuration 600 with an additional component of a physical layer of a distributed computing system, according to some embodiments. The additional component can be an additional switch 602. The updated configuration 600 can correspond to a cloud infrastructure component topology that has multiple nodes, which may represent computing devices or other infrastructure components within the distributed computing system. The nodes can include node 606, node 608, node 610, and node 612. The nodes 606-612 may be similar to the nodes described above with respect to FIGS. 5A and 5B.

A combined configuration of a distributed computing system may be updated based on the addition of a new or modified subset configuration. For example, a network architect may design a new cloud infrastructure component topology for the distributed computing system due to the addition of cloud infrastructure components that can include additional nodes. The updated configuration 600 can include the new or modified subset configuration that corresponds to the new cloud infrastructure component topology. The updated configuration 600 can include adding the additional switch 602 and other physical networking components (e.g., cabling) to network node 612 with node 606, node 608, and node 610. Such a change can occur to modifying a computing environment (e.g., a testing environment) to represent additional components.

The updated configuration 600 can be determined by a computing device (e.g., computing device 120 of FIG. 1) that has been configured to determine configurations (e.g., combined configurations) from specified subset configurations of the cloud infrastructure component topology. The computing device can determine the updated configuration 600 as a union of the subset configurations and the new or modified subset configuration. The computing device can use the updated configuration to provide instructions to add a network device (e.g., switch 602) to the physical layer of the distributed computing system. The updated configuration 600 can then represent a new combined configuration for the distributed computing system.

Figure 7:
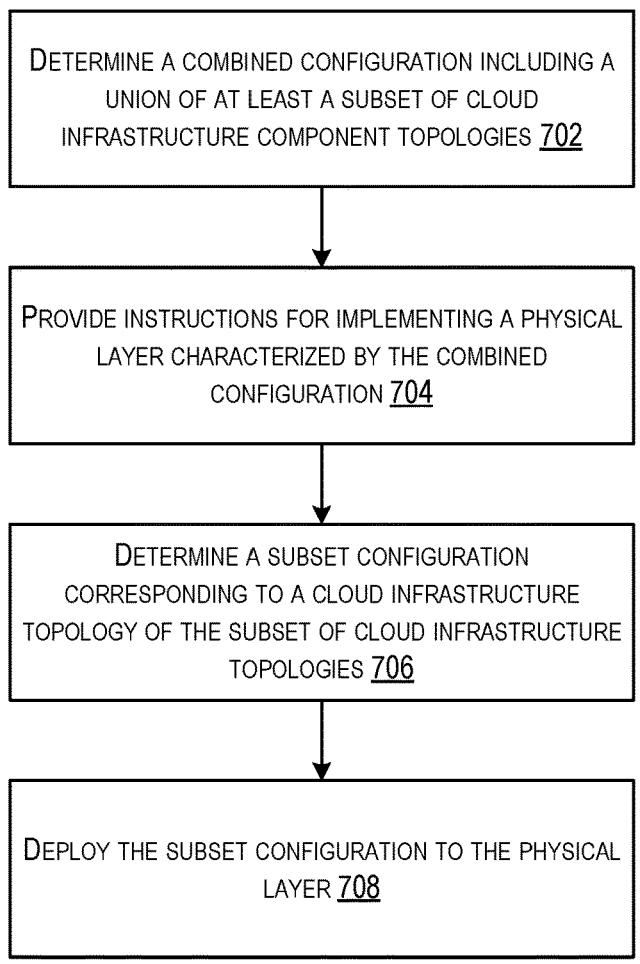
FIG. 7 is a flow diagram of an example process to determine a combined configuration of a distributed computing system and deploy a subset configuration to the physical layer of the distributed computing system, according to some embodiments.

FIG. 7 is a flow diagram of an example process 700 to determine a combined configuration of a distributed computing system and deploy a subset configuration to the physical layer of the distributed computing system, according to some embodiments. The combined configuration may be an example of combined configuration 400 described above with respect to FIG. 4.

The process 700 may begin at block 702 with a computing device (e.g., computing device 120 of FIG. 1) of a distributed computing system can determine a combined configuration of cloud infrastructure component topologies. The combined configuration can include one or more subset configurations. Each subset configuration can correspond to a particular cloud infrastructure component topology of the distributed computing system.

At block 704, the computing device can provide instructions to implement a physical layer of the distributed computing system. The physical layer can include networking devices communicatively connected one or more computing devices. The physical layer may correspond to the physical components of the network of computing resources within the distributed computing system. The computing device can use the combined configuration to generate and provide the instructions. In some embodiments, the computing device can select a set of instructions for implementing the physical layer from a predetermined collection of instructions for deploying components of a network.

At block 706, the computing device can determine a subset configuration of the combined configuration. The subset configuration can correspond to a portion of the cloud infrastructure component topology specified by the combined configuration. The subset configuration may be a cloud infrastructure component topology suitable for a test environment of the distributed computing system. In some embodiments, the subset of network topologies can define communication connections (e.g., networking connections) between one or more domains (e.g., one or more ADs) of one or more data centers that are part of the distributed computing system. In some embodiments, the physical layer can include one or more cross domain systems. The cross domain systems may be configured to enable and secure the communication connections between the domains.

At block 708, the computing device can deploy the subset configuration to the physical layer. The subset configuration may be deployed by configuring one or more network components of the physical layer to modify the cloud infrastructure component topology of the distributed computing system. For example, the computing device can deploy the subset configuration by configuring a switch to activate and/or deactivate specific ports that connect components that are part of the subset of network topologies. As another example, the computing device can deploy the subset configuration by configuring a networking device to direct network traffic to conform to the cloud infrastructure component topology, for instance by modifying network addresses of component endpoints, modifying routing tables, or the like.

In some embodiments, the computing device can perform a test on the distributed computing system. The test can be configured to evaluate performance metrics associated with the subset of network topologies. For example, the test can include evaluating network latency, packet loss, retry rate, connection drop occurrence rate, and other similar networking metrics.

In some embodiments, the computing device can determine a second subset configuration of the combined configuration. The second subset configuration can correspond to a second cloud infrastructure component topology different from the first cloud infrastructure component topology. The computing device may then deploy the second subset configuration the physical layer, thereby reconfiguring the cloud infrastructure component topology of the distributed computing system to conform to the second cloud infrastructure component topology. The computing device can also perform an additional test to evaluate network performance metrics.

In some embodiments, the computing device can determine an updated configuration that corresponds to an additional cloud infrastructure component topology. Based on the updated configuration, the computing device can provide additional instructions to add a network device to the physical layer.

Example Infrastructure as a Service Architectures

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model may require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed may need to first be set up. In some instances, the provisioning can be done manually, a provisioning tool may be utilized to provision the resources, and/or deployment tools may be utilized to deploy the code once the infrastructure is provisioned.

Figure 8:
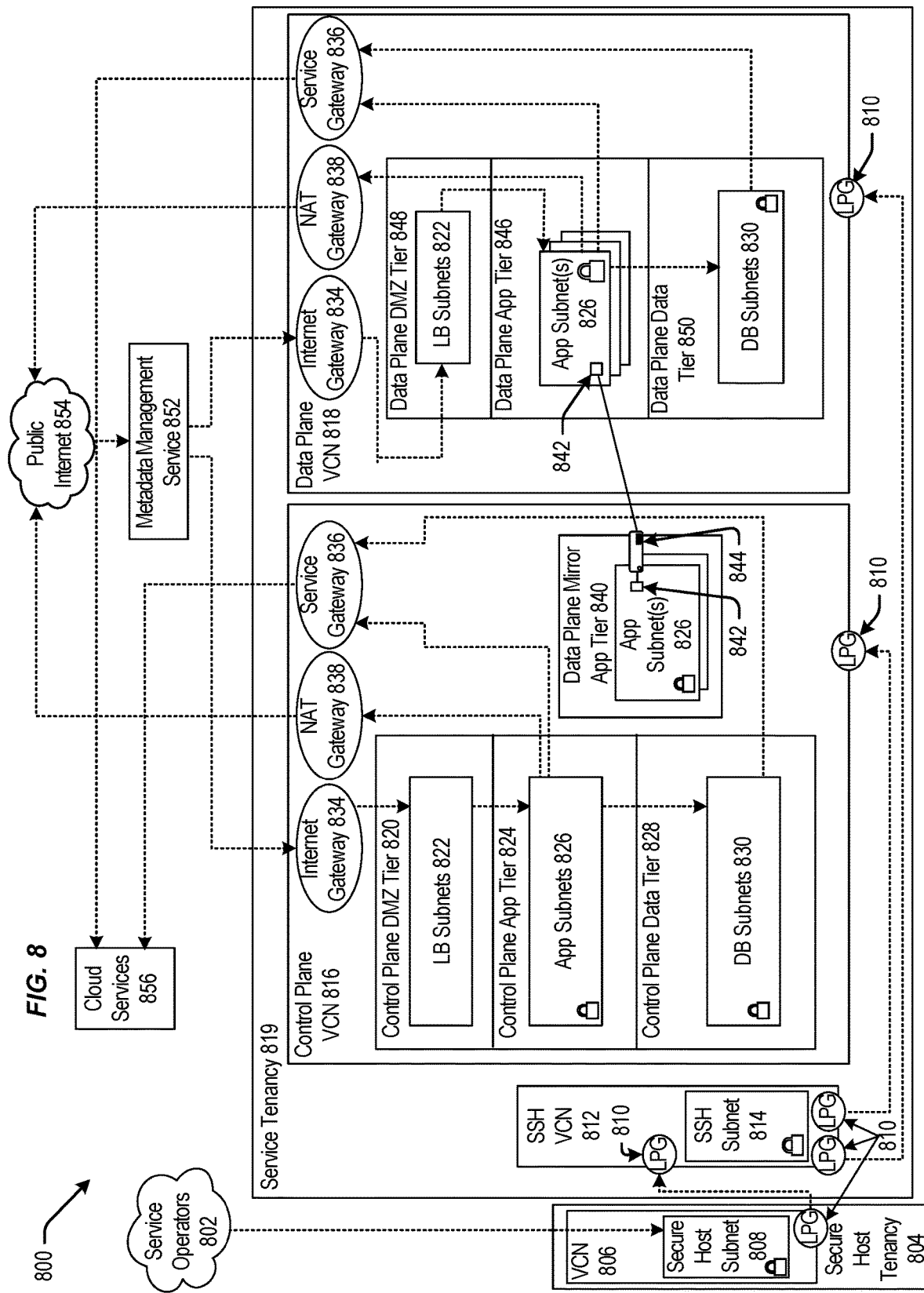
FIG. 8 is a block diagram illustrating one pattern for implementing a cloud infrastructure as a service system, according to at least one embodiment.

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 819 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane mirror app tier 840 can include a virtual network interface controller (VNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the dataplane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 can be communicatively couple to cloud services 856.

In some examples, the service gateway 836 of the control plane VCN 816 or of the data plane VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. But, cloud services 856 may not initiate API calls to the service gateway 836.

In some examples, the secure host tenancy 804 can be directly connected to the service tenancy 819, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 819.

The control plane VCN 816 may allow users of the service tenancy 819 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the dataplane mirror app tier 840 of the control plane VCN 816 can communicate with the data plane app tier 846 of the data plane VCN 818 via VNIC s 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Memory that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and the dataplane VCN 818 can be contained in the service tenancy 819. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 819. This embodiment can enable isolation of networks that may prevent users or customers from interacting with other users', or other customers', resources. Also, this embodiment may allow users or customers of the system to store databases privately without needing to rely on public Internet 854, which may not have a desired level of threat prevention, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 819, which may be isolated from public Internet 854.

Figure 9:
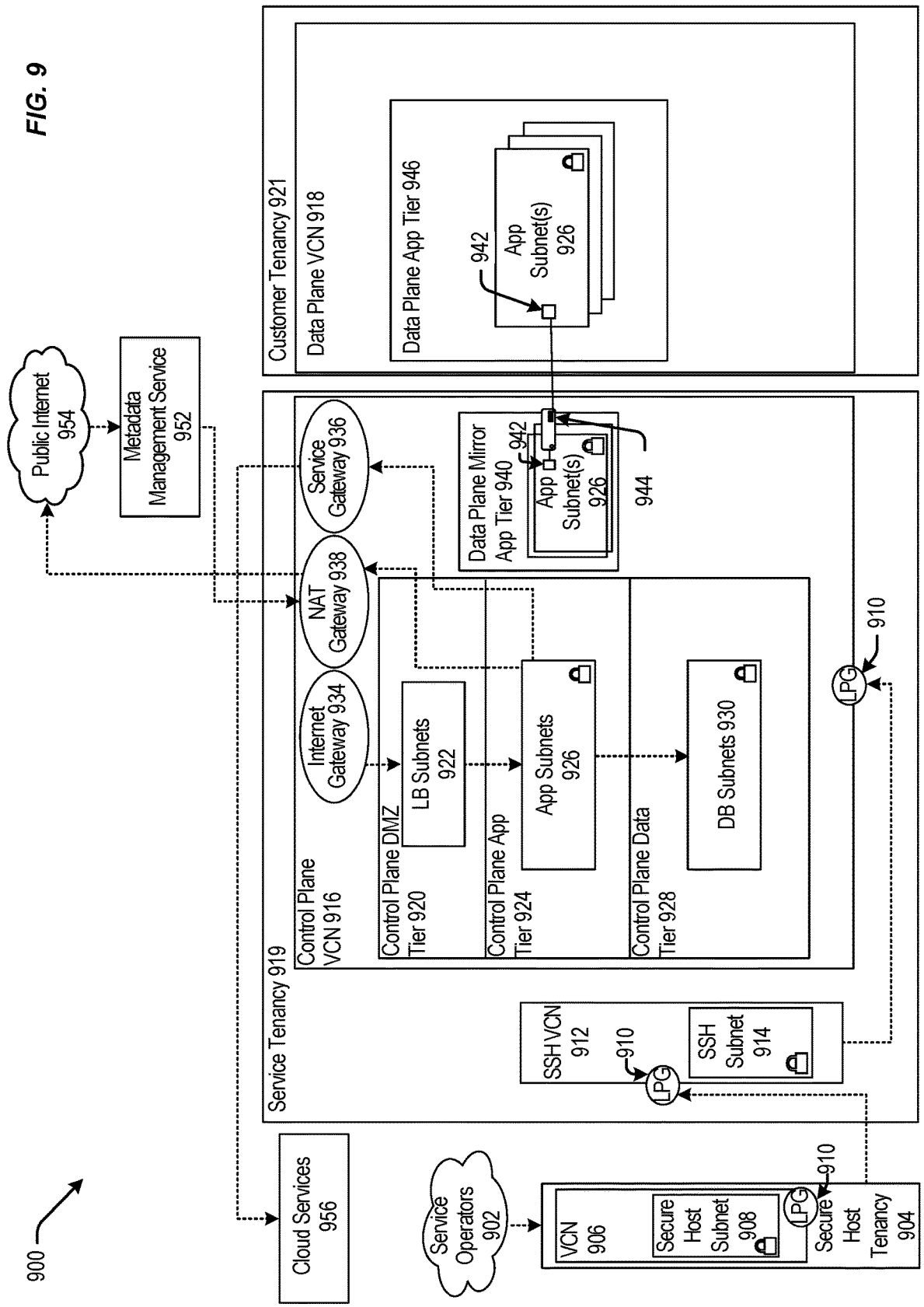
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 802 of FIG. 8) can be communicatively coupled to a secure host tenancy 904 (e.g., the secure host tenancy 804 of FIG. 8) that can include a virtual cloud network (VCN) 906 (e.g., the VCN 806 of FIG. 8) and a secure host subnet 908 (e.g., the secure host subnet 808 of FIG. 8). The VCN 906 can include a local peering gateway (LPG) 910 (e.g., the LPG 810 of FIG. 8) that can be communicatively coupled to a secure shell (SSH) VCN 912 (e.g., the SSH VCN 812 of FIG. 8) via an LPG 810 contained in the SSH VCN 912. The SSH VCN 912 can include an SSH subnet 914 (e.g., the SSH subnet 814 of FIG. 8), and the SSH VCN 912 can be communicatively coupled to a control plane VCN 916 (e.g., the control plane VCN 816 of FIG. 8) via an LPG 910 contained in the control plane VCN 916. The control plane VCN 916 can be contained in a service tenancy 919 (e.g., the service tenancy 819 of FIG. 8), and the data plane VCN 918 (e.g., the data plane VCN 818 of FIG. 8) can be contained in a customer tenancy 921 that may be owned or operated by users, or customers, of the system.

The control plane VCN 916 can include a control plane DMZ tier 920 (e.g., the control plane DMZ tier 820 of FIG. 8) that can include LB subnet(s) 922 (e.g., LB subnet(s) 822 of FIG. 8), a control plane app tier 924 (e.g., the control plane app tier 824 of FIG. 8) that can include app subnet(s) 926 (e.g., app subnet(s) 826 of FIG. 8), a control plane data tier 928 (e.g., the control plane data tier 828 of FIG. 8) that can include database (DB) subnet(s) 930 (e.g., similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g., the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g., the service gateway of FIG. 8) and a network address translation (NAT) gateway 938 (e.g., the NAT gateway 838 of FIG. 8). The control plane VCN 916 can include the service gateway 936 and the NAT gateway 938.

The control plane VCN 916 can include a data plane mirror app tier 940 (e.g., the data plane mirror app tier 840 of FIG. 8) that can include app subnet(s) 926. The app subnet(s) 926 contained in the data plane mirror app tier 940 can include a virtual network interface controller (VNIC) 942 (e.g., the VNIC of 842) that can execute a compute instance 944 (e.g., similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g., the data plane app tier 846 of FIG. 8) via the VNIC 942 contained in the data plane mirror app tier 940 and the VNIC 942 contained in the data plane app tier 946.

The Internet gateway 934 contained in the control plane VCN 916 can be communicatively coupled to a metadata management service 952 (e.g., the metadata management service 852 of FIG. 8) that can be communicatively coupled to public Internet 954 (e.g., public Internet 854 of FIG. 8). Public Internet 954 can be communicatively coupled to the NAT gateway 938 contained in the control plane VCN 916. The service gateway 936 contained in the control plane VCN 916 can be communicatively couple to cloud services 956 (e.g., cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 919. Each compute instance 944 may allow communication between the control plane VCN 916, contained in the service tenancy 919, and the data plane VCN 918 that is contained in the customer tenancy 921. The compute instance 944 may allow resources, which are provisioned in the control plane VCN 916 that is contained in the service tenancy 919, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane mirror app tier 940 may be configured to make calls to the data plane VCN 918 but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN 918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 8," may be located in Region 1 and in "Region 2." If a call to Deployment 8 is made by the service gateway 936 contained in the control plane VCN 916 located in Region 1, the call may be transmitted to Deployment 8 in Region 1. In this example, the control plane VCN 916, or Deployment 8 in Region 1, may not be communicatively coupled to, or otherwise in communication with, Deployment 8 in Region 2.

Figure 10:
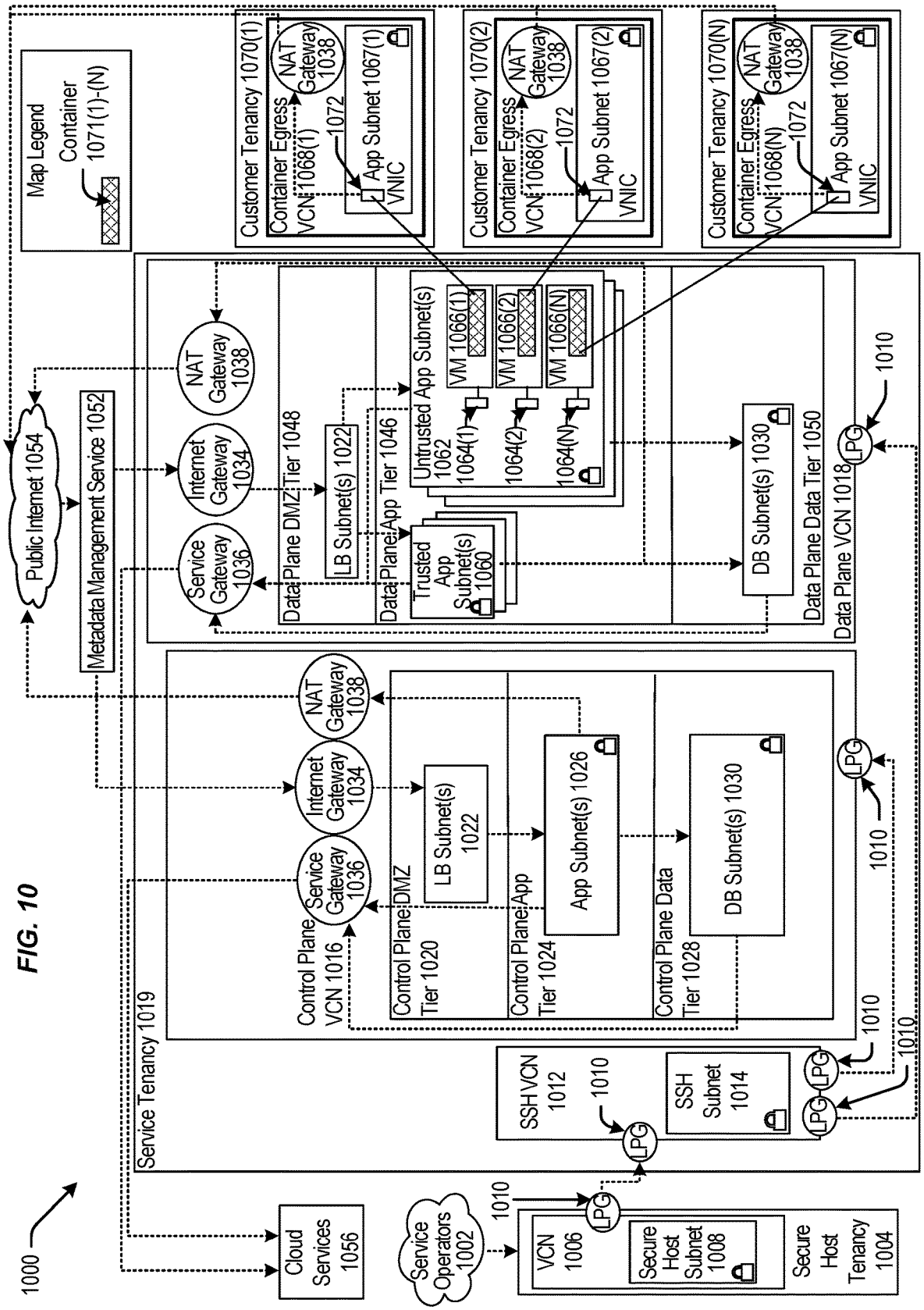
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 802 of FIG. 8) can be communicatively coupled to a secure host tenancy 1004 (e.g., the secure host tenancy 804 of FIG. 8) that can include a virtual cloud network (VCN) 1006 (e.g., the VCN 806 of FIG. 8) and a secure host subnet 1008 (e.g., the secure host subnet 808 of FIG. 8). The VCN 1006 can include an LPG 1010 (e.g., the LPG 810 of FIG. 8) that can be communicatively coupled to an SSH VCN 1012 (e.g., the SSH VCN 812 of FIG. 8) via an LPG 1010 contained in the SSH VCN 1012. The SSH VCN 1012 can include an SSH subnet 1014 (e.g., the SSH subnet 814 of FIG. 8), and the SSH VCN 1012 can be communicatively coupled to a control plane VCN 1016 (e.g., the control plane VCN 816 of FIG. 8) via an LPG 1010 contained in the control plane VCN 1016 and to a data plane VCN 1018 (e.g., the data plane 818 of FIG. 8) via an LPG 1010 contained in the data plane VCN 1018. The control plane VCN 1016 and the data plane VCN 1018 can be contained in a service tenancy 1019 (e.g., the service tenancy 819 of FIG. 8).

The control plane VCN 1016 can include a control plane DMZ tier 1020 (e.g., the control plane DMZ tier 820 of FIG. 8) that can include load balancer (LB) subnet(s) 1022 (e.g., LB subnet(s) 822 of FIG. 8), a control plane app tier 1024 (e.g., the control plane app tier 824 of FIG. 8) that can include app subnet(s) 1026 (e.g., similar to app subnet(s) 826 of FIG. 8), a control plane data tier 1028 (e.g., the control plane data tier 828 of FIG. 8) that can include DB subnet(s) 1030. The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036 (e.g., the service gateway of FIG. 8) and a network address translation (NAT) gateway 1038 (e.g., the NAT gateway 838 of FIG. 8). The control plane VCN 1016 can include the service gateway 1036 and the NAT gateway 1038.

The data plane VCN 1018 can include a data plane app tier 1046 (e.g., the data plane app tier 846 of FIG. 8), a data plane DMZ tier 1048 (e.g., the data plane DMZ tier 848 of FIG. 8), and a data plane data tier 1050 (e.g., the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant VM 1066(1)-(N) can be communicatively coupled to a respective app subnet 1067(1)-(N) that can be contained in respective container egress VCNs 1068(1)-(N) that can be contained in respective customer tenancies 1070(1)-(N). Respective secondary VNICs 1072(1)-(N) can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g., public Internet 854 of FIG. 8).

The Internet gateway 1034 contained in the control plane VCN 1016 and contained in the data plane VCN 1018 can be communicatively coupled to a metadata management service 1052 (e.g., the metadata management system 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some embodiments, the data plane VCN 1018 can be integrated with customer tenancies 1070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1046. Code to run the function may be executed in the VMs 1066(1)-(N), and the code may not be configured to run anywhere else on the data plane VCN 1018. Each VM 1066(1)-(N) may be connected to one customer tenancy 1070. Respective containers 1071(1)-(N) contained in the VMs 1066(1)-(N) may be configured to run the code. In this case, there can be a dual isolation (e.g., the containers 1071(1)-(N) running code, where the containers 1071(1)-(N) may be contained in at least the VM 1066(1)-(N) that are contained in the untrusted app subnet(s) 1062), which may help prevent incorrect or otherwise undesirable code from damaging the network of the IaaS provider or from damaging a network of a different customer. The containers 1071(1)-(N) may be communicatively coupled to the customer tenancy 1070 and may be configured to transmit or receive data from the customer tenancy 1070. The containers 1071(1)-(N) may not be configured to transmit or receive data from any other entity in the data plane VCN 1018. Upon completion of running the code, the IaaS provider may kill or otherwise dispose of the containers 1071(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1071(1)-(N) that can be contained in the VM 1066(1)-(N) of each customer and that may run code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the dataplane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

Figure 11:
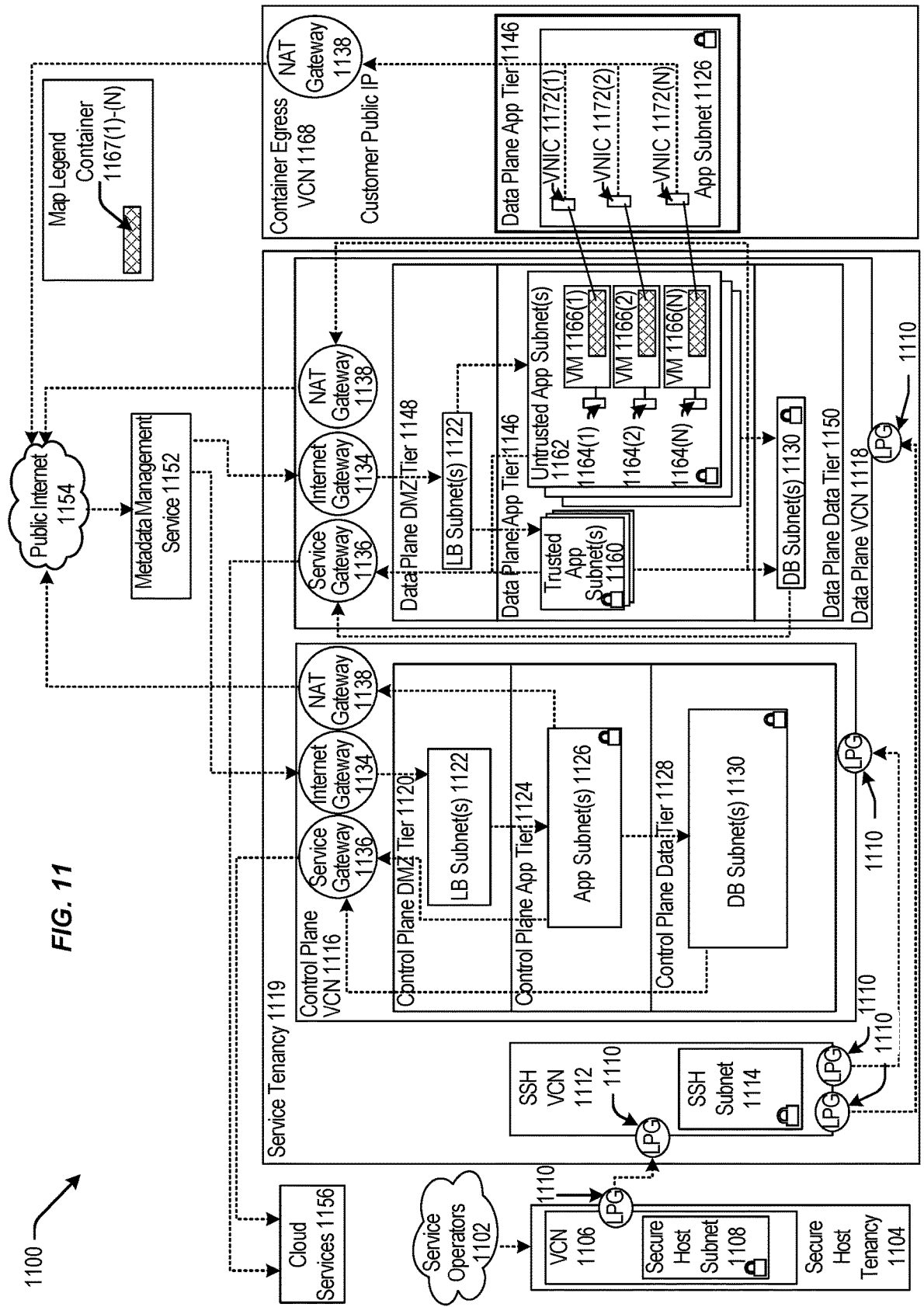
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g., service operators 802 of FIG. 8) can be communicatively coupled to a secure host tenancy 1104 (e.g., the secure host tenancy 804 of FIG. 8) that can include a virtual cloud network (VCN) 1106 (e.g., the VCN 806 of FIG. 8) and a secure host subnet 1108 (e.g., the secure host subnet 808 of FIG. 8). The VCN 1106 can include an LPG 1110 (e.g., the LPG 810 of FIG. 8) that can be communicatively coupled to an SSH VCN 1112 (e.g., the SSH VCN 812 of FIG. 8) via an LPG 1110 contained in the SSH VCN 1112. The SSH VCN 1112 can include an SSH subnet 1114 (e.g., the SSH subnet 814 of FIG. 8), and the SSH VCN 1112 can be communicatively coupled to a control plane VCN 1116 (e.g., the control plane VCN 816 of FIG. 8) via an LPG 1110 contained in the control plane VCN 1116 and to a data plane VCN 1118 (e.g., the data plane 818 of FIG. 8) via an LPG 1110 contained in the data plane VCN 1118. The control plane VCN 1116 and the data plane VCN 1118 can be contained in a service tenancy 1119 (e.g., the service tenancy 819 of FIG. 8).

The control plane VCN 1116 can include a control plane DMZ tier 1120 (e.g., the control plane DMZ tier 820 of FIG. 8) that can include LB subnet(s) 1122 (e.g., LB subnet(s) 822 of FIG. 8), a control plane app tier 1124 (e.g., the control plane app tier 824 of FIG. 8) that can include app subnet(s) 1126 (e.g., app subnet(s) 826 of FIG. 8), a control plane data tier 1128 (e.g., the control plane data tier 828 of FIG. 8) that can include DB subnet(s) 1130 (e.g., DB subnet(s) 1030 of FIG. 10). The LB subnet(s) 1122 contained in the control plane DMZ tier 1120 can be communicatively coupled to the app subnet(s) 1126 contained in the control plane app tier 1124 and to an Internet gateway 1134 (e.g., the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g., the service gateway of FIG. 8) and a network address translation (NAT) gateway 1138 (e.g., the NAT gateway 838 of FIG. 8). The control plane VCN 1116 can include the service gateway 1136 and the NAT gateway 1138.

The data plane VCN 1118 can include a data plane app tier 1146 (e.g., the data plane app tier 846 of FIG. 8), a data plane DMZ tier 1148 (e.g., the data plane DMZ tier 848 of FIG. 8), and a data plane data tier 1150 (e.g., the data plane data tier 850 of FIG. 8). The data plane DMZ tier 1148 can include LB subnet(s) 1122 that can be communicatively coupled to trusted app subnet(s) 1160 (e.g., trusted app subnet(s) 1060 of FIG. 10) and untrusted app subnet(s) 1162 (e.g., untrusted app subnet(s) 1062 of FIG. 10) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant VM 1166(1)-(N) can run code in a respective container 1167(1)-(N), and be communicatively coupled to an app subnet 1126 that can be contained in a data plane app tier 1146 that can be contained in a container egress VCN 1168. Respective secondary VNICs 1172(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g., public Internet 854 of FIG. 8).

The Internet gateway 1134 contained in the control plane VCN 1116 and contained in the data plane VCN 1118 can be communicatively coupled to a metadata management service 1152 (e.g., the metadata management system 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some examples, the pattern illustrated by the architecture of block diagram 1100 of FIG. 11 may be considered an exception to the pattern illustrated by the architecture of block diagram 1000 of FIG. 10 and may be desirable for a customer of the IaaS provider if the IaaS provider cannot directly communicate with the customer (e.g., a disconnected region). The respective containers 1167(1)-(N) that are contained in the VMs 1166(1)-(N) for each customer can be accessed in real-time by the customer. The containers 1167(1)-(N) may be configured to make calls to respective secondary VNICs 1172(1)-(N) contained in app subnet(s) 1126 of the data plane app tier 1146 that can be contained in the container egress VCN 1168. The secondary VNICs 1172(1)-(N) can transmit the calls to the NAT gateway 1138 that may transmit the calls to public Internet 1154. In this example, the containers 1167(1)-(N) that can be accessed in real-time by the customer can be isolated from the control plane VCN 1116 and can be isolated from other entities contained in the data plane VCN 1118. The containers 1167(1)-(N) may also be isolated from resources from other customers.

In other examples, the customer can use the containers 1167(1)-(N) to call cloud services 1156. In this example, the customer may run code in the containers 1167(1)-(N) that requests a service from cloud services 1156. The containers 1167(1)-(N) can transmit this request to the secondary VNIC s 1172(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 12:
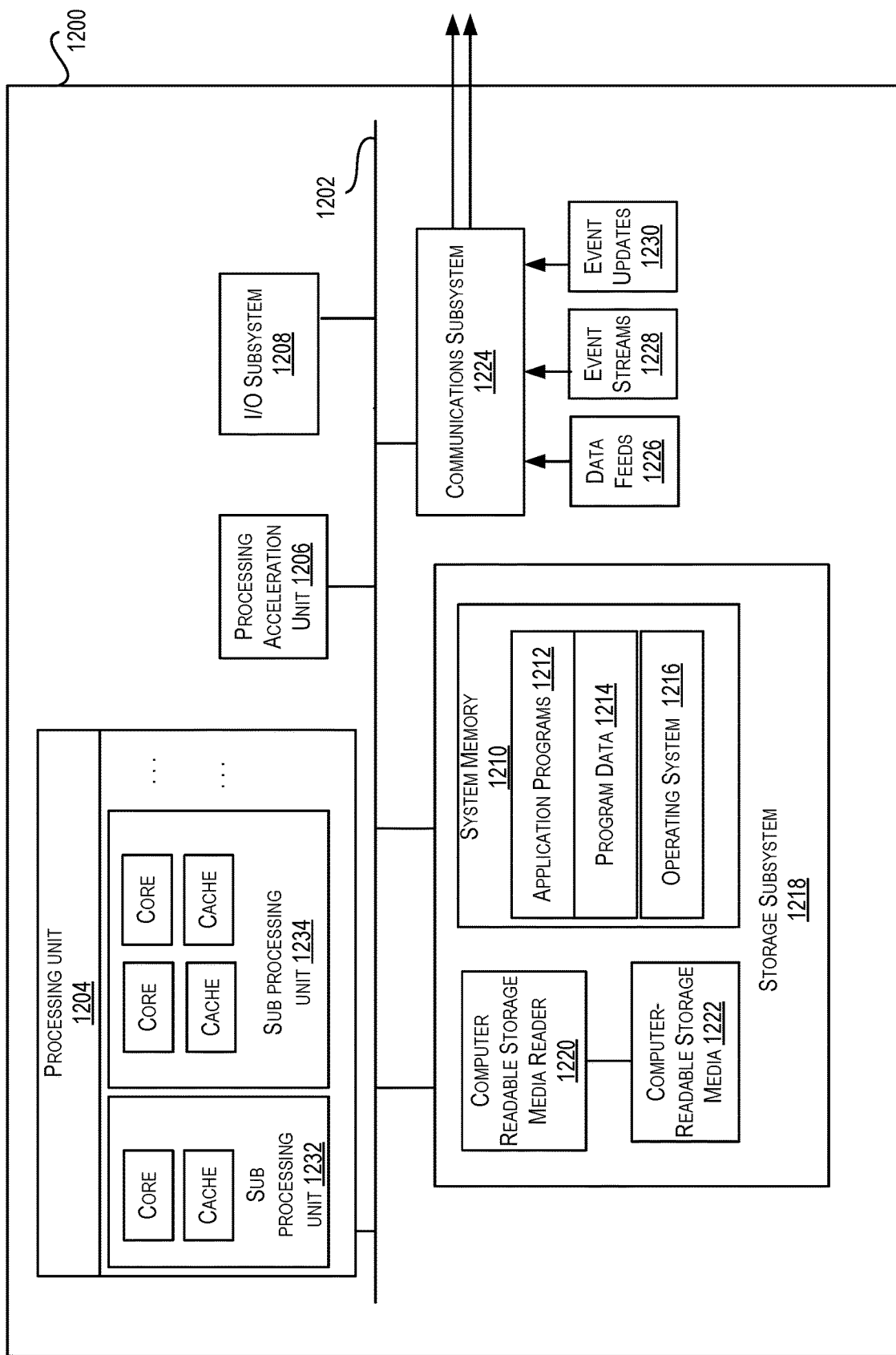
FIG. 12 is a block diagram illustrating an example computer system, according to at least one embodiment.

FIG. 12 illustrates an example computer system 1200, in which various embodiments may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, web cams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display sub system, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1204 provide the functionality described above. Storage subsystem 1218 may also provide a repository for storing data used in accordance with the present disclosure.

As depicted in the example in FIG. 12, storage subsystem 1218 can include various components including a system memory 1210, computer-readable storage media 1222, and a computer readable storage media reader 1220. System memory 1210 may store program instructions that are loadable and executable by processing unit 1204. System memory 1210 may also store data that is used during the execution of the instructions and/or data that is generated during the execution of the program instructions. Various different kinds of programs may be loaded into system memory 1210 including but not limited to client applications, Web browsers, mid-tier applications, relational database management systems (RDBMS), virtual machines, containers, etc.

System memory 1210 may also store an operating system 1216. Examples of operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1200 executes one or more virtual machines, the virtual machines along with their guest operating systems (GOSs) may be loaded into system memory 1210 and executed by one or more processors or cores of processing unit 1204.

System memory 1210 can come in different configurations depending upon the type of computer system 1200. For example, system memory 1210 may be volatile memory (such as random access memory (RAM)) and/or non-volatile memory (such as read-only memory (ROM), flash memory, etc.). Different types of RAM configurations may be provided including a static random access memory (SRAM), a dynamic random access memory (DRAM), and others. In some implementations, system memory 1210 may include a basic input/output system (BIOS) containing basic routines that help to transfer information between elements within computer system 1200, such as during start-up.

Computer-readable storage media 1222 may represent remote, local, fixed, and/or removable storage devices plus storage media for temporarily and/or more permanently containing, storing, computer-readable information for use by computer system 1200 including instructions executable by processing unit 1204 of computer system 1200.

Computer-readable storage media 1222 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1222 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Machine-readable instructions executable by one or more processors or cores of processing unit 1204 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof)), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
   determining, by a computing device, a combined configuration for a physical layer of a network of a distributed computing system, the combined configuration (i) comprising a union of at least a first cloud infrastructure component topology and a second cloud infrastructure component topology of the distributed computing system and (ii) defining communication connections between one or more availability domains of one or more data centers comprising the distributed computing system, the one or more availability domains characterized by separate networking components connected by the communication connections defined by the combined configuration;
   providing, by the computing device, instructions for implementing the physical layer of the distributed computing system, the physical layer characterized by the combined configuration;
   determining, by the computing device, a first subset configuration of the distributed computing system to test, the first subset configuration corresponding to the first cloud infrastructure component topology;
   deploying, by the computing device, the first subset configuration to the physical layer, thereby implementing the first cloud infrastructure component topology on the physical layer of the network;
   determining, by the computing device, a second subset configuration of the distributed computing system to test, the second subset configuration corresponding to the second cloud infrastructure component topology; and
   deploying, by the computing device, the second subset configuration to the physical layer, thereby implementing the second cloud infrastructure component topology on the physical layer of the network.

2. The method of claim 1, further comprising performing a test on the distributed computing system prior to deploying the second subset configuration to the physical layer, the test configured to evaluate performance metrics associated with the first cloud infrastructure component topology.

3. The method of claim 1 further comprising:
   performing an additional test on the distributed computing system after deploying the second subset configuration to the physical layer, the additional test configured to evaluate network performance metrics associated with the second cloud infrastructure component topology.

4. The method of claim 1, wherein deploying the second subset configuration to the physical layer comprises replacing the first subset configuration for the first cloud infrastructure component topology with the second subset configuration.

5. The method of claim 1, wherein the physical layer comprises a plurality of networking devices communicatively connected to one or more computing devices of the distributed computing system, wherein deploying the first subset configuration to the physical layer comprises configuring the plurality of networking devices to direct network traffic to conform to the first cloud infrastructure component topology, and wherein deploying the second subset configuration to the physical layer comprises configuring the plurality of networking devices to direct network traffic to conform to the second cloud infrastructure component topology.

6. The method of claim 1, wherein the physical layer comprises a plurality of networking devices communicatively connected to one or more computing devices of the distributed computing system, and wherein deploying the first subset configuration to the physical layer comprises configuring at least one of the plurality of networking devices to direct network traffic to conform to the first cloud infrastructure component topology.

7. The method of claim 1 further comprising:
   determining an updated configuration comprising an additional cloud infrastructure component topology of the distributed computing system; and
   providing, based at least in part on the updated configuration, instructions to add a network device to the physical layer.

8. The method of claim 1, wherein the physical layer comprises one or more cross domain systems configured to enable the communication connections between the one or more availability domains, the communication connections secured by the cross domain system.

9. A computing device, comprising:
one or more processors; and
one or more memories storing computer-executable instructions that, when executed by the one or more processors, cause the computing device to:
determine a combined configuration for a physical layer of a network of a distributed computing system, the combined configuration (i) comprising a union of at least a first cloud infrastructure component topology and a second cloud infrastructure component topology of the distributed computing system and (ii) defining communication connections between one or more availability domains of one or more data centers comprising the distributed computing system, the one or more availability domains characterized by separate networking components connected by the communication connections defined by the combined configuration;
provide instructions for implementing the physical layer of the distributed computing system, the physical layer characterized by the combined configuration;
determine a first subset configuration of the distributed computing system to test, the first subset configuration corresponding to the first cloud infrastructure component topology;
deploy the first subset configuration to the physical layer, thereby implementing the first cloud infrastructure component topology on the physical layer of the network;
determine a second subset configuration of the distributed computing system to test, the second subset configuration corresponding to the second cloud infrastructure component topology; and
deploy the second subset configuration to the physical layer, thereby implementing the second cloud infrastructure component topology on the physical layer of the network.

10. The computing device of claim 9, wherein the one or more memories store additional instructions that, when executed by the one or more processors, cause the computing device to further perform a test on the distributed computing system prior to deploying the second subset configuration to the physical layer, the test configured to evaluate performance metrics associated with the first cloud infrastructure component topology.

11. The computing device of claim 9, wherein the one or more memories store additional instructions that, when executed by the one or more processors, cause the computing device to further:
perform an additional test on the distributed computing system after deploying the second subset configuration to the physical layer, the additional test configured to evaluate network performance metrics associated with the second cloud infrastructure component topology.

12. The computing device of claim 9, wherein deploying the second subset configuration to the physical layer comprises replacing the first subset configuration for the first cloud infrastructure component topology with the second subset configuration.

13. The computing device of claim 9, wherein the physical layer comprises a plurality of networking devices communicatively connected to one or more computing devices of the distributed computing system, wherein deploying the first subset configuration to the physical layer comprises configuring the plurality of networking devices to direct network traffic to conform to the first cloud infrastructure component topology, and wherein deploying the second subset configuration to the physical layer comprises configuring the plurality of networking devices to direct network traffic to conform to the second cloud infrastructure component topology.

14. The computing device of claim 9, wherein the physical layer comprises a plurality of networking devices communicatively connected to one or more computing devices of the distributed computing system, and wherein deploying the first subset configuration to the physical layer comprises configuring at least one of the plurality of networking devices to direct network traffic to conform to the first cloud infrastructure component topology.

15. The computing device of claim 9 wherein the one or more memories store additional instructions that, when executed by the one or more processors, cause the computing device to further:
determine an updated configuration comprising an additional cloud infrastructure component topology of the distributed computing system; and
provide, based at least in part on the updated configuration, instructions to add a network device to the physical layer.

16. A non-transitory computer-readable storage medium storing computer-executable instructions, that, when executed by one or more processors, cause a computing device to:
determine a combined configuration for a physical layer of a network of a distributed computing system, the combined configuration 1) comprising a union of at least a first cloud infrastructure component topology and a second cloud infrastructure component topology of the distributed computing system and (ii) defining communication connections between one or more availability domains of one or more data centers comprising the distributed computing system, the one or more availability domains characterized by separate networking components connected by the communication connections defined by the combined configuration;
provide instructions for implementing the physical layer of the distributed computing system, the physical layer characterized by the combined configuration;
determine a first subset configuration of the distributed computing system to test, the first subset configuration corresponding to the first cloud infrastructure component topology;
deploy the first subset configuration to the physical layer, thereby implementing the first cloud infrastructure component topology on the physical layer of the network;
determine a second subset configuration of the distributed computing system to test, the second subset configuration corresponding to the second cloud infrastructure component topology; and
deploy the second subset configuration to the physical layer, thereby implementing the second cloud infrastructure component topology on the physical layer of the network.

17. The non-transitory computer-readable storage medium of claim 16, storing additional instructions that, when executed by the one or more processors, cause the computing device to further perform a test on the distributed computing system prior to deploying the second subset configuration to the physical layer, the test configured to evaluate performance metrics associated with the first cloud infrastructure component topology.

18. The non-transitory computer-readable storage medium of claim 16, storing additional instructions that, when executed by the one or more processors, cause the computing device to further:
perform an additional test on the distributed computing system after deploying the second subset configuration to the physical layer, the additional test configured to evaluate network performance metrics associated with the second cloud infrastructure component topology.

19. The non-transitory computer-readable storage medium of claim 16, storing additional instructions that, when executed by the one or more processors, cause the computing device to further:
determine an updated configuration comprising an additional cloud infrastructure component topology of the distributed computing system; and
provide, based at least in part on the updated configuration, instructions to add a network device to the physical layer.

* * * * *

UNITED STATES PATENT AND TRADEMARK OFFICE
CERTIFICATE OF CORRECTION

PATENT NO. : 12,034,595 B2
APPLICATION NO. : 17/984569
DATED : July 9, 2024
INVENTOR(S) : Adogla et al.

It is certified that error appears in the above-identified patent and that said Letters Patent is hereby corrected as shown below:

In the Specification

In Column 8, Line 1, delete "availability" and insert -- Availability --, therefor.

In Column 14, Line 42, delete "dataplane" and insert -- data plane --, therefor.

In Column 15, Line 7, delete "dataplane" and insert -- data plane --, therefor.

In Column 15, Line 9, delete "VNIC s" and insert -- VNICs --, therefor.

In Column 15, Line 40, delete "dataplane" and insert -- data plane --, therefor.

In Column 20, Line 1, delete "dataplane" and insert -- data plane --, therefor.

In Column 21, Lines 55-56, delete "VNIC s" and insert -- VNICs --, therefor.

In Column 23, Lines 32-33, delete "sub system," and insert -- subsystem, --, therefor.

In Column 24, Line 1, delete "Web" and insert -- web --, therefor.

In the Claims

In Column 30, Line 32, in Claim 16, delete "1)" and insert -- (i) --, therefor.

Signed and Sealed this
Tenth Day of December, 2024

Katherine Kelly Vidal
*Director of the United States Patent and Trademark Office*